G. D. MUNSING.
SPEED CHANGING MECHANISM.
APPLICATION FILED FEB. 8, 1909.
937,321.
Patented Oct. 19, 1909.
2 SHEETS—SHEET 1.
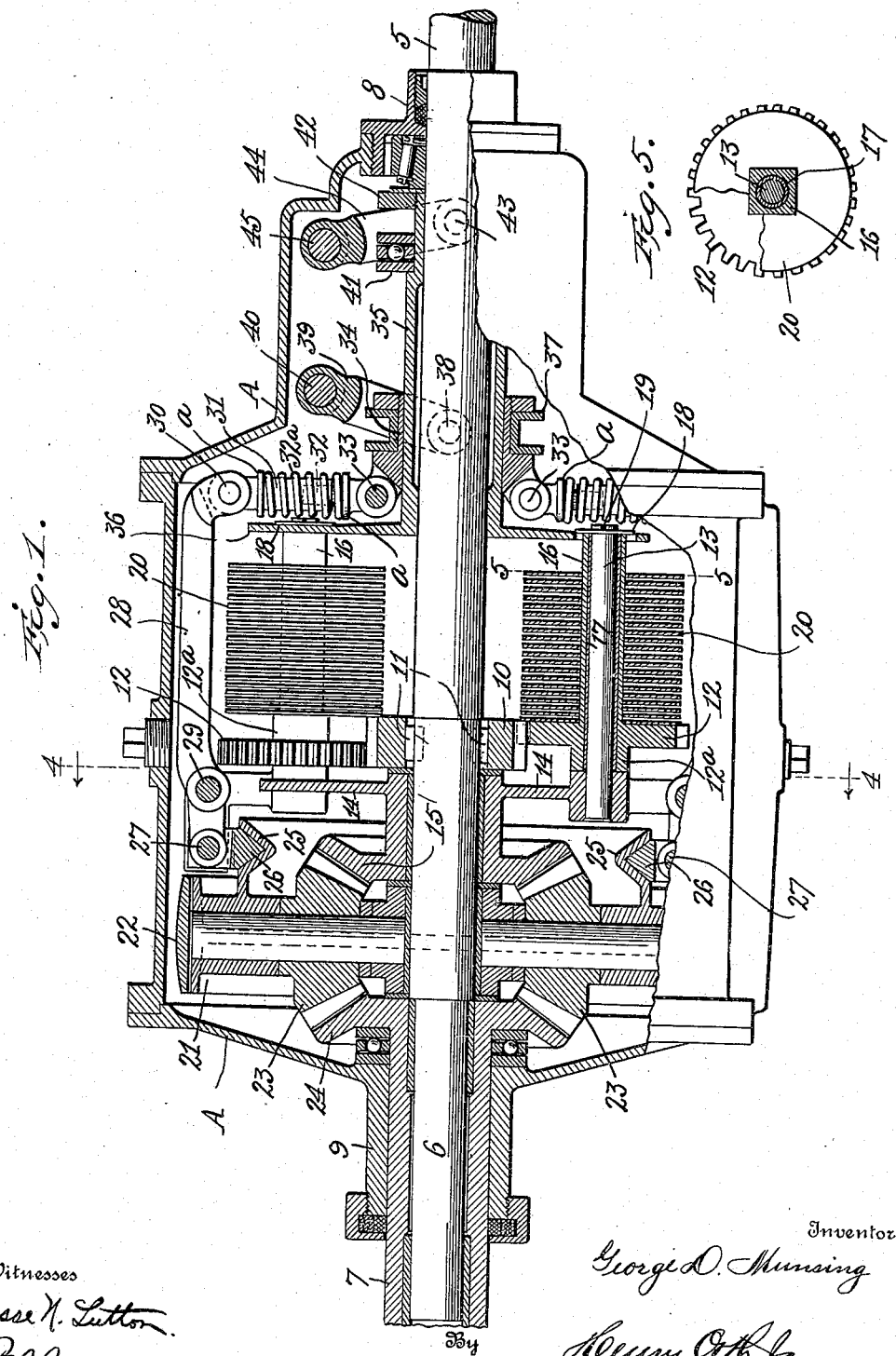
Witnesses
Jesse N. Lutton
B. Sommers
Inventor
George D. Munsing
By
Henry Orth
Attorney

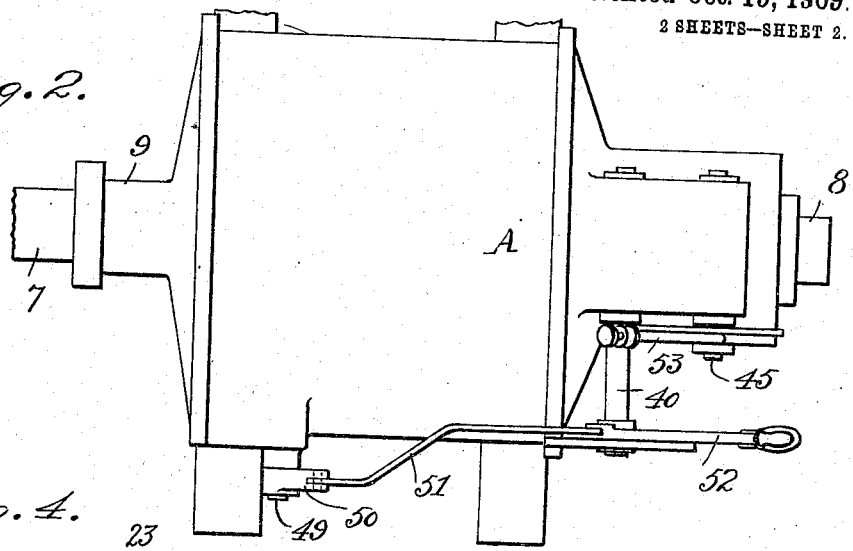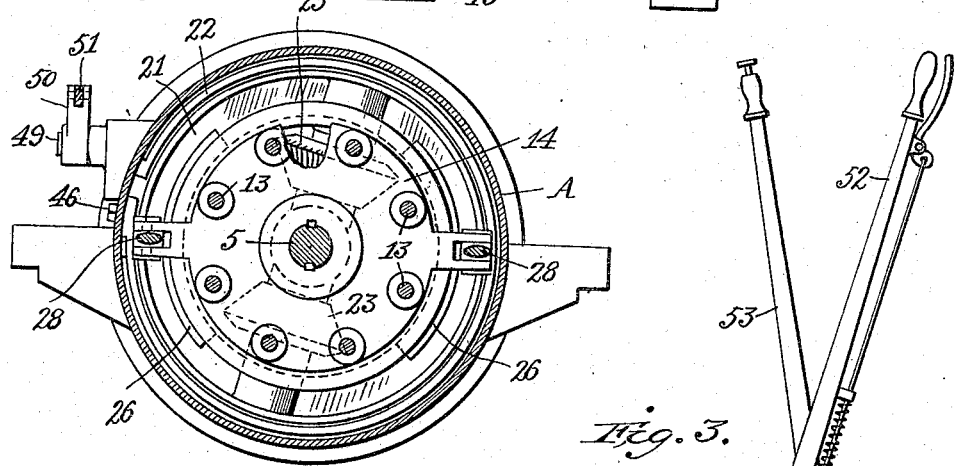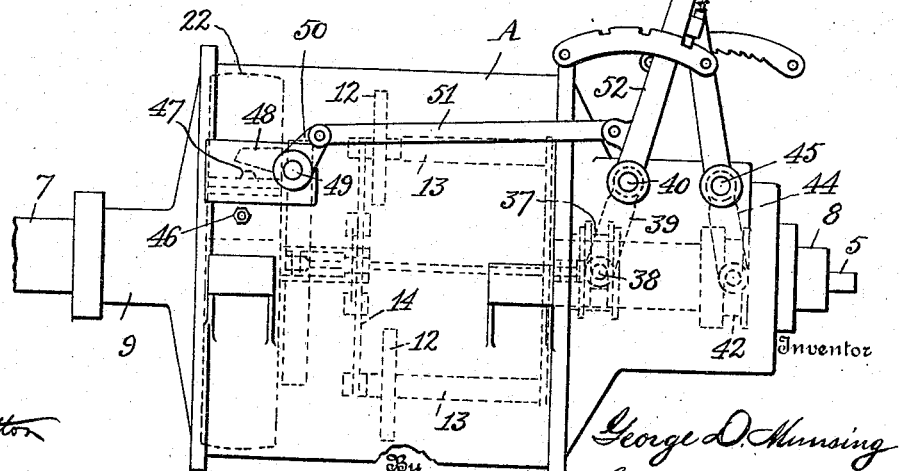

UNITED STATES PATENT OFFICE.

GEORGE D. MUNSING, OF HOBOKEN, NEW JERSEY.

SPEED-CHANGING MECHANISM.

937,321.

Specification of Letters Patent.  Patented Oct. 19, 1909.

Application filed February 8, 1909. Serial No. 476,599.

*To all whom it may concern:*

Be it known that I, GEORGE D. MUNSING, a citizen of the United States of America, residing at Hoboken, county of Hudson, State of New Jersey, United States of America, have invented certain new and useful Improvements in Speed-Changing Mechanism; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to speed changing mechanisms and has for its object to provide a simple and efficient mechanism of this type for changing the speed of a driven shaft, while maintaining the driving shaft at engine speed and is more particularly adapted for motor boats and like vehicles and the invention consists in the construction and assemblage of parts hereinafter to be described and particularly pointed out in the claims.

Certain features of the construction herein shown are described and claimed in my copending application Ser. No. 476,401, filed Feby. 6, 1909.

Referring to the drawings, in which like parts are similarly designated, Figure 1 is a vertical longitudinal section of the transmission mechanism. Fig. 2 is a plan view on a smaller scale. Fig. 3 is a side elevation of Fig. 2. Fig. 4 is a sectional view on the line 4—4 of Fig. 1. Fig. 5 is a section on line 5—5 of Fig. 1.

The driving shaft 5 has a reduced portion 6 that enters the hollow adjacent end of the driven shaft 7. The driving shaft 5 is journaled in a bearing 8 at one end of the casing A and the driven shaft 7 is journaled in a similar bearing 9 at the opposite end of the casing A. On the driving shaft 5 is secured a pinion 10 by means of splines or keys 11 and this pinion gears with planet gear wheels 12 free to rotate on the shafts 13 secured in a plate or planet carrier 14, said plate 14 being secured to or forming part of a beveled gear wheel 15, both free to rotate with respect to the driving shaft 5. The planet gear wheels 12 have bosses 12$^a$ slightly longer than the width of a gear wheel so that these planet wheels, when necessary can overlap one another. The pinion 10 being wide enough to engage all of the planet gear wheels 12. Secured to or made in one piece with the planet gear wheels 12 are elongated extensions or shanks 16 and in these shanks are bushings 17. These gear wheels 12 are held in place by means of a washer 18 secured to the shaft 13 by means of a cotter pin at 19. On the shanks 16 are mounted friction plates 20 the set of friction plates pertaining to each planet wheel alternating with and overlapping the friction plates pertaining to each adjacent planet gear wheel.

Mounted free to rotate on the driving shaft is a brake wheel 21 provided with a band brake 22 and having mounted therein two beveled planet pinions 23 which gear with the beveled gear wheel 15 loose on the driving shaft and also gear with a bevel gear wheel 24 secured to the driven shaft. The brake wheel 21 has an additional friction surface V-shaped in section as shown at 25 and this clutch member is engaged by two oppositely situated arcuate clutch shoes 26 each pivotally connected at 27 to the short arm of a two armed lever 28 fulcrumed at 29 to the plate 14 and the longer arm of this lever 28 is pivotally connected at 30 to a sleeve 31 that takes over and slides on a pin 32 pivotally connected at 33 to a sleeve 34, suitably mounted and slidable on the pressure plate sleeve 35. A coil spring 32$^a$ surrounds the sleeve 31 between abutment flanges $a$ on the sleeve 31 and pin 32 to produce a yielding pressure on the clutch shoes 26. The pressure plate 36 is connected to sleeve 35 for moving the pressure plate to exert pressure on the friction plates 20. Mounted in the sleeve 34 is an annular grooved member 37 into which take the pins 38 of a shifting fork 39 secured to a shaft 40. The sleeve 35 is provided with a thrust ball bearing 41 and a collar 42 between which take the pins 43 of a shifting fork 44 mounted on a shaft 45. The brake band 22, see Fig. 3, is secured at its stationary end to the casing A by a bolt or screw 46 and its free end is provided with a rounded cylindrical projection 47 in the path of the short lever 48 mounted on a shaft 49 journaled in the casing and operated by a crank arm 50. The crank arm 50 is connected by a link 51 to an operating lever 52 mounted on the shaft 40 for operating the shifting fork 39. The point of connection of the link 51 to the lever 52 is above the shaft 40 so that when the shifting fork 39 is moved in one direction the link 51 will be moved in the opposite direction whereby when brakes 26 are applied the brake 22 will be released and vice versa. The shaft 45 is also connected to an operating lever 53. These levers are of well known construction and operate in connection with stationary segments as shown in Fig. 3.

The operation of the device is as follows: When the lever 52, Fig. 3 is moved to the left in the middle notch of the segment, the mechanism runs idle, that is the driving shaft 5 can impart no movement to the driven shaft 7. To go forward the lever 52 is first moved from the middle notch to the right to throw in the clutch shoes 26 and cause them to engage their friction surfaces 25. The lever 53 is now moved to the right to move the compressor plate 36 against the friction plates 20, whereupon these friction plates retard the rotation of the gear wheels 12 and revolve with them and plate 14 about shaft 5, imparting speed to the driven shaft 5, which speed gradually increases until the plates are locked, when the driven and driving shafts rotate in unison. By moving the pressure plate 36 to its limit against the friction plates 20 and moving the lever 52 so that the toggle connection between lever 28 and the shifting sleeve 34 is in the position shown in Fig. 1, there will be no slip between the coöperating parts of the mechanism and the brake wheel 21 will be driven at the speed of the driving shaft so that the driven shaft will then rotate in unison with the driving shaft without lag. The brake band 22 remains, of course, released. To reverse, the friction plates 20 are released and the lever 52 is moved to its full extent to the left the brake shoes 26 are released and the brake band 22 applied so that the brake wheel 21 is held stationary. The friction plates 20 are now applied retarding as before the rotation of the planet gear wheels 12 driven by the pinion 10 to cause these planet gear wheels and their pertaining friction plates to revolve about the axis of the driving shaft thereby causing the bevel gear wheel 15 and plate 14 in which the planet gear wheels are mounted to rotate imparting rotation to the bevel pinions 23 about their axes and reversing the direction of the rotation of the driven shaft 7.

It will be noted that the same speeds can be obtained upon reversal as at forward driving, the friction plates controlling the speed in both directions.

I claim:—

1. The combination with a driving and a driven shaft; of a pinion keyed to the driving shaft, planet gear wheels meshing with said pinion and means to frictionally retard the movement of the planet gear wheels, a bevel gear wheel loose on the driving shaft, a supporting member for the planet gear wheels rotatable with respect to the driving shaft, said support and bevel gear wheel rotating in unison, a brake wheel, beveled pinions mounted in the brake wheel, meshing with the beveled gear wheel and a beveled gear wheel on the driven shaft, also meshing with said pinions and means to brake said brake wheel.

2. The combination with a driving shaft and a driven shaft; of a pinion keyed to the driving shaft, planet gear wheels meshing with said pinion and means to frictionally retard the rotation of the planet gear wheels on their axes, a beveled gear wheel loose on the driving shaft, a supporting member for the planet gear wheels rotatable with respect to the driving shaft, said supporting member and bevel gear wheel rotating in unison, a brake wheel having a brake surface, beveled pinions mounted in the brake wheel and meshing with the beveled wheel and a beveled gear wheel on the driven shaft also meshing with said pinions and a brake member capable of being applied to the brake surface.

3. The combination with two alined shafts; of a bevel gear wheel loose on one of them and a similar bevel gear wheel secured to the other, mechanism to variably drive the first mentioned bevel gear wheel from its shaft, a brake wheel free to rotate, bevel pinions mounted in the brake wheel and gearing with both bevel gear wheels, and a brake engaging the brake wheel and a clutch capable of connecting the brake wheel and said mechanism.

4. The combination with two alined shafts; of a bevel gear wheel loose on one of them and a similar bevel gear wheel secured to the other, mechanism to variably drive the first mentioned bevel gear wheel from its shaft, a brake wheel free to rotate, bevel pinions mounted in the brake wheel and gearing with both gear wheels, a brake engaging said wheel and means to connect said mechanism to the brake wheel.

5. The combination with two alined shafts and a pinion secured to and a bevel gear wheel loose on one of them; of a planet gear wheel support secured to the bevel gear wheel, planet gear wheels mounted on the support and gearing with the pinion, friction disks rotating in unison with the planet gear wheels and means to cause said disks to frictionally engage, a brake wheel free to rotate with respect to the shafts having two friction faces, a bevel gear wheel on the other shaft, bevel planet pinions in the brake wheel, a brake band for the brake wheel, a lever pivotally mounted on the support, a friction member on the lever to engage the brake wheel, a sleeve slidable and rotatable with respect to one of the shafts, a yielding toggle connection between the sleeve and lever and means to actuate the brake band.

6. The combination with two shafts; of planet mechanism driven by one of them, friction mechanism for controlling the speed of the planet mechanism, reversing mechanism, and means to clutch the planet mechanism to a part of the reversing mechanism.

7. The combination with two shafts; of planet mechanism, mechanism for controlling the speed of the planet mechanism, reversing mechanism between the planet mechanism and second shaft and means to clutch the planet mechanism to a part of the reversing mechanism whereby the second shaft rotates at the same speed as the planet mechanism.

8. The combination with two shafts; of planet mechanism driven by one of said shafts, friction mechanism to retard the rotation of the planet mechanism, reversing mechanism for the other shaft and means to connect the planet mechanism to part of the reversing mechanism, said reversing mechanism operable when the connecting means is disengaged.

9. The combination with two shafts; of planet mechanism driven by one of said shafts, friction mechanism to retard the rotation of the planet mechanism, reversing mechanism for the other shaft and means to connect the planet mechanism to part of the reversing mechanism, said reversing mechanism operable when the connecting means is disengaged, the speed of said other shaft being controlled when rotating in either direction by said friction mechanism.

10. The combination with two shafts; of planet mechanism driven by one of said shafts, sets of overlapping friction plates carried by and rotated by the planet mechanism, reversing planet mechanism between the first mentioned planet mechanism and the other shaft, and clutch mechanism carried by the first planet mechanism to connect the latter to a part of the reversing mechanism.

11. The combination with two shafts; of a planet carrier, a bevel gear wheel connected thereto and planet gear wheels driven from one of the shafts, friction mechanism to control the rotation of the planet gear wheels, a bevel gear wheel connected to the other shaft, a brake wheel and bevel planet pinions mounted thereon gearing with the aforesaid bevel gear wheels, a brake for said wheel, and clutch members pivotally mounted on the carrier to engage the brake wheel.

In testimony that I claim the foregoing as my invention, I have signed my name in presence of two subscribing witnesses.

GEORGE D. MUNSING.

Witnesses:
JAMES H. WESTCOTT,
ELMER G. SAMMIS.